United States Patent [19]

Heckeroth

[11] 4,138,208
[45] Feb. 6, 1979

[54] DIE FACE CUTTER

[75] Inventor: Earl T. Heckeroth, Midland, Mich.

[73] Assignee: The Dow Chemical Company, Midland, Mich.

[21] Appl. No.: 766,302

[22] Filed: Feb. 7, 1977

[51] Int. Cl.² ............................................. B29F 3/08
[52] U.S. Cl. .................................... 425/71; 425/308; 425/382 R; 425/464; 425/DIG. 230
[58] Field of Search ............ 425/378 R, 378 S, 379 R, 425/379 S, 309, 311, 313, 382 R, 72 R, 382.2, 463, 464, 725, 308, DIG. 230; 264/176 R, 176 F, 177 R, 177 F, 348, 142, 143, 141, 148

[56] References Cited

U.S. PATENT DOCUMENTS

| | | | |
|---|---|---|---|
| 2,401,236 | 5/1946 | Fielitz | 425/313 |
| 3,039,142 | 6/1962 | Zavasnik | 425/378 X |
| 3,461,495 | 8/1969 | Swickard et al. | 425/382 X |
| 3,600,748 | 8/1971 | Faehndrich et al. | 425/379 R |
| 3,857,665 | 12/1974 | Kennedy | 425/382 R X |
| 3,888,610 | 6/1975 | Brackmann et al. | 425/72 S |

FOREIGN PATENT DOCUMENTS 2140194  2/1973  Fed. Rep. of Germany ...... 425/379 R

Primary Examiner—Francis S. Husar
Assistant Examiner—Mark Rosenbaum

[57] ABSTRACT

An improved die face cutter is provided which is particularly suited for preparing pellets of synthetic resinous extrudable thermoplastics wherein the strand being extruded is surrounded by cooling water on emergence from the die and prior to encountering the cutter blade.

3 Claims, 5 Drawing Figures

DIE FACE CUTTER

Many plastic materials are provided to the processor in the form of granules. In many instances, such granules are formed by the extrusion of a plurality of strands which are subsequently cut into a plurality of granules. Often the length of the granules is from about one-half of three times the strand diameter. Strands of plastics can be cut with varying degrees of difficulty or ease depending upon the basic nature of the extruded material, temperature and the like. One particularly desirable form of die face cutter is disclosed in U.S. Patent Application Ser. No. 619,350 filed Oct. 3, 1975, now U.S. Pat. No. 4,021,176. Water-cooled knives and water spray cooling are employed to chill the extruded strand and enhance the cutting characteristics of the extruded thermoplastics. Another die face cutting arrangement effectively extrudes a strand through a porous bushing and a cooling fluid is forced inwardly through the porous bushing to cool the external surfaces of the strand prior to contact with a cutting knife. Such apparatus for many applications can be unduly complex, require substantial mechanical adjustment and oftentimes repair or replacement of plugged bushings, knives and the like.

It would be desirable if there were available an improved plastic strand cutter of relatively simple construction.

It would also be desirable if there were available an improved strand cutter of simple construction which would permit liquid or gas cooling of the extruded strand.

It would also be desirable if there were available an improved plastic strand cutting apparatus which permitted fluid cooling of the strand on extrusion which could be maintained with minimal effort.

These benefits and other advantages in accordance with the present invention are achieved in an apparatus for the preparation of granules from a plurality of extruded heat-plastified synthetic resinous thermoplastic strands, the apparatus comprising in cooperative combination a die, the die having a die body, the die body defining a plenum, the plenum having means to communicate with a source of heat-plastified synthetic resinous material, the die having a die face of generally annular configuration, the die body adjacent the die face defining a plurality of extrusion openings communicating with the annular plenum, the extrusion openings capable of extruding a heat-plastified synthetic resinous strand, the extrusion openings terminating on the die face remote from the means to communicate with the source of heat-plastified thermoplastic resinous material, a cooling fluid jacket disposed adjacent the die face and being generally spaced from the die face, the cooling fluid jacket defining a plurality of jacket extrusion openings corresponding to the extrusion openings, the cooling fluid jacket being supported by the die body, the cooling fluid jacket defining a jacket cavity therein, the cavity having means to receive cooling fluid from space external to the cooling fluid jacket, each of the jacket extrusion openings in the cooling fluid jacket having in association therewith at least one passage in communication with the jacket cavity, a rotatable cutter adapted to engage extruded thermoplastic strands emerging from the openings of the cooling jacket and sever the strands into pellets or granules.

Further features and advantages of the present invention will become more apparent from the following specification taken in connection with the drawing wherein:

FIG. 1 schematically depicts a view of a cutting apparatus in accordance with the present invention;

Figure 1:
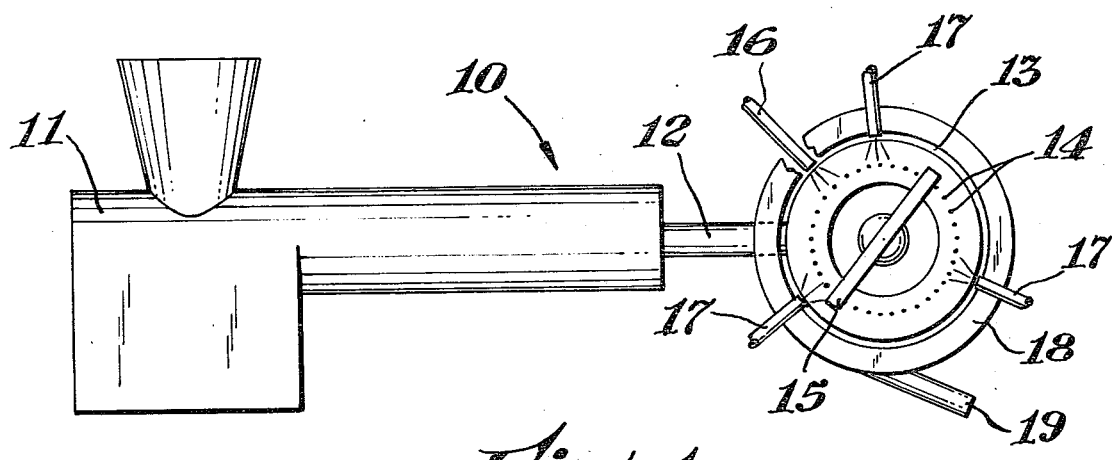

In FIG. 1 there is schematically depicted an extrusion and pelleting apparatus in accordance with the present invention generally designated by the reference numeral 10. The apparatus 10 comprises in cooperative combination a source 11 of heat-plastified synthetic resinous material such as an extruder. The source 11 has a discharge conduit 12 which in turn is in communication with a die of generally circular configuration having an annular plenum disposed therein. The die 13 has a plurality of extrusion openings 14 arranged in a circular manner generally coaxial with the die. The extrusion openings 14 are generally coplanar. A rotatable cutting blade 15 is mounted generally concentrically with the circle formed by the openings 14. A cooling fluid jacket forms the visible face of the die 13. A cooling fluid supply means 16 is in operative combination with a generally annular chamber, (not shown), within the die 13. Three external cooling fluid supply means or nozzles 17 are generally radially directed inwardly toward the face of die 13. A shroud or cowl 18 is disposed about the die 13 and adapted to collect granules generated therein. The shroud 18 has a discharge conduit 19.

In operation of the apparatus as depicted in FIG. 1, heat-plastified synthetic resinous material is supplied by the extruder 11 to the discharge conduit 12 to the body of the die 13 where it is distributed to the extrusion openings 14 and extruded therefrom as a continuous strand. A cooling fluid, for example, water flows into the source 16 and is discharged generally coaxial with the strand at each of the openings 14. Rotation of the cutter or blade 15 severs the strands into granules. Additional cooling liquid such as a water spray is provided by the nozzle 17. The granules together with any cooling liquid are restrained by the shroud 18 and discharged from the discharge opening 19.

Figure 2:
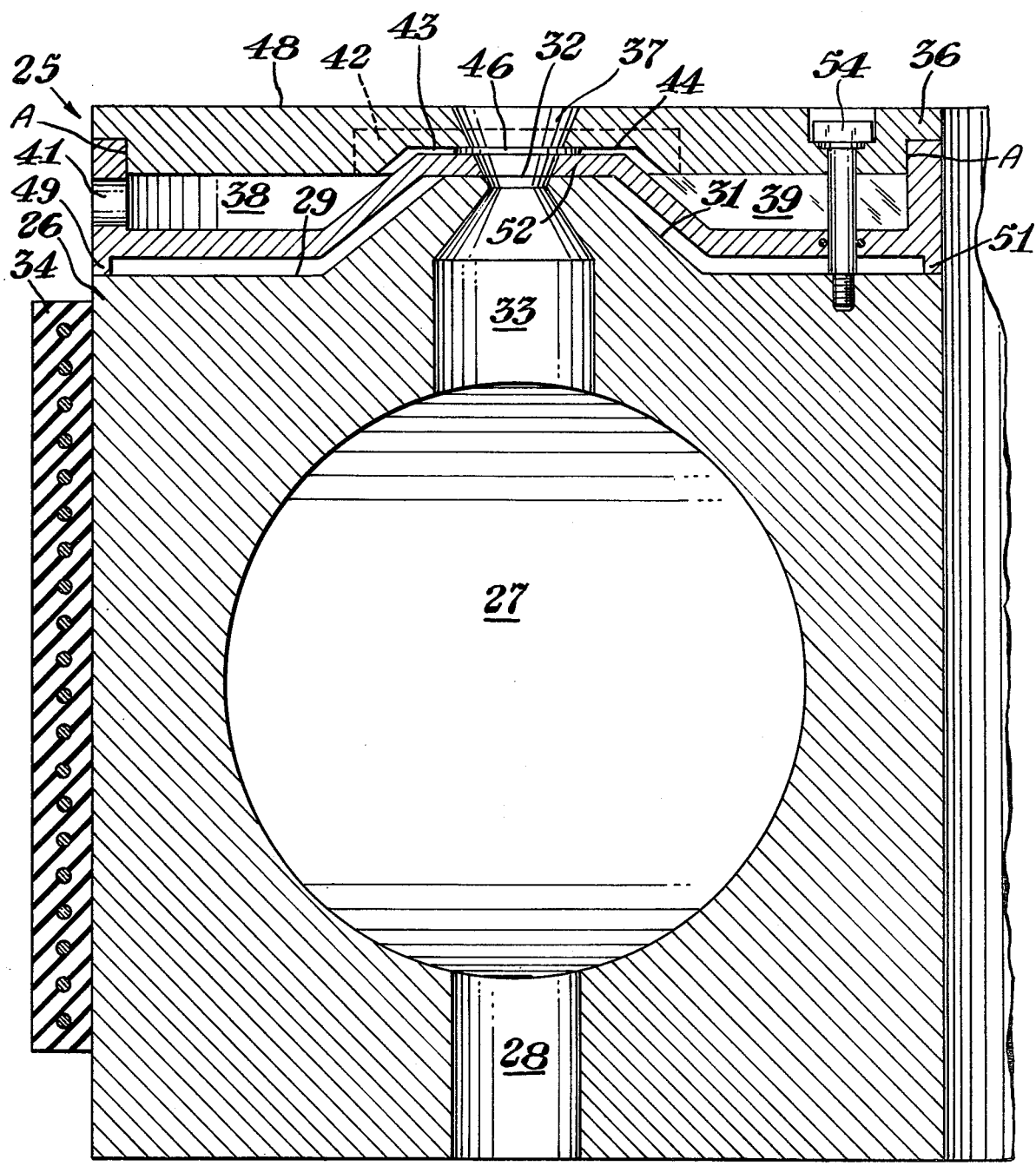
FIG. 2 is a radial sectional view through an annular die such as the die employed in FIG. 1.

In FIG. 2 there is schematically depicted a radial sectional view of a die 25 similar to the die 13 of FIG. 1. The die 25 comprises a generally annular die body 26. The die body 26 defines therein a generally annular cavity 27. The cavity 27 is in operative communication with a heat-plastified polymer supply passageway 28. The die body 26 defines an extrusion face 29 having an annular land 31 disposed thereon. The land 31 defines a plurality of extrusion openings 32. Associated with each of the extrusion openings or orifices 32 is a polymer supply passageway 33 which is in full communication with the annular plenum 27. An electrical band heater 34 is disposed about the die body 26. A generally annular cooling fluid jacket 36 is disposed adjacent the face 29 and is generally spaced therefrom. The jacket 36 defines a plurality of extrusion openings 37 which are generally coaxial with the extrusion openings 32 of the die body 26. As depicted in FIG. 2, the openings 32 and 37 inwardly taper at a rate generally commensurate with expected die swell. Within the cooling fluid jacket 36 is disposed a first or outer annular passage 38 and a second or inner annular passage 39. The passageways 38 and 39 are disposed generally on opposite sides of the land 31 of the die body 26. The cooling fluid jacket 36 defines a cooling fluid supply passage 41 which provides full communication between the first annular passageway 38 and space external to the cooling fluid jacket 36. The cooling fluid jacket 36 defines a plurality of major radial internal passages 42 providing full communication between the annular passages 38 and 39. The jacket 36 defines a plurality of orifice passages 43 extending from the annular plenum 38 into the extrusion opening 37. A second plurality of minor cooling passages 44 are defined by the jacket 36 and provide communication between the extrusion orifice 37 and the annular space 39. An annular recess 46 is defined by the cooling jacket at a location adjacent to the extrusion orifice 32 of the body 26 and remote from an external cooling jacket body face 48 remotely disposed from the face 29 of the die body 26. The cooling jacket 36 is generally spaced from the face 29 of the body 26 by a first or outer land 49 and a second or inner land 51. Space between the jacket 36 and face optionally may contain thermal insulation. The cooling jacket 36 contacts the die body at a terminal face 52 of the land 31 adjacent the extrusion orifices 32. The cooling fluid jacket 36 is affixed to the die body 26 by means of a plurality of shoulder screws or stripper bolts 54 passing through the cooling jacket 36 and through appropriately threaded openings in the surface 29 of the die body 26. Beneficially, O-rings are employed as cooling fluid seals in the event the stripper bolt passes through one of the cavities 38 or 39.

Figure 3:
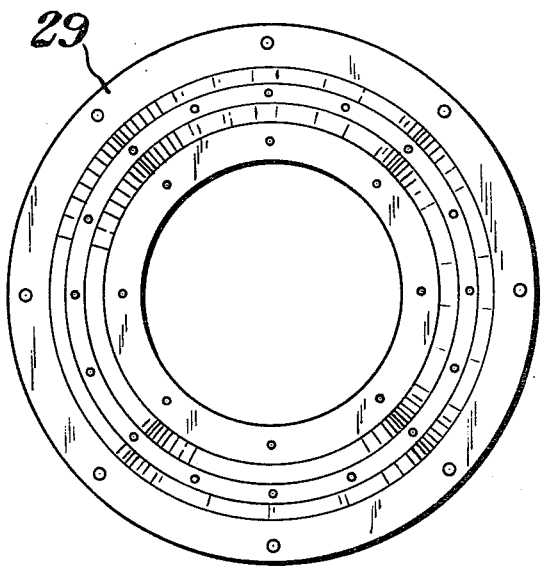
FIG. 3 is a face view of a die body such as is depicted in FIG. 2.

FIG. 3 depicts a face view of the die body 26 of FIG. 2 and shows the arrangement of extrusion openings 32, the land 31 and the terminal face 52 of the land 31.

Figure 4:
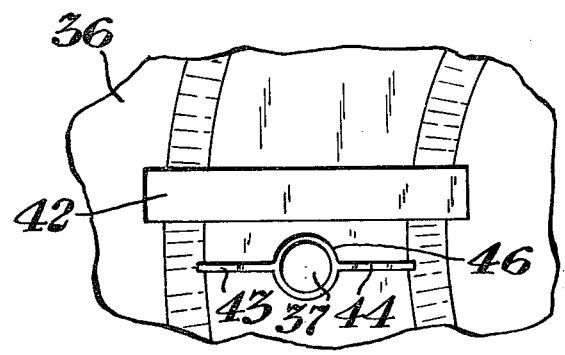
FIG. 4 is a fractional view of internal channels formed within the cooling fluid jacket of FIG. 2 adjacent an extrusion opening of the cooling fluid jacket.

FIG. 4 is a fractional view of a portion of the cooling fluid jacket 36 showing the disposition of the minor passageways 43, 44, the extrusion orifice 37 and the annular recess 46 together with a major passageway 42. When cooling fluid enters the passageway 41, it flows through the annular passage 38 through the major passageway 42 to effectively fill both of the annular passageways 38 and 39. The cooling fluid can then only escape from the cooling jacket 36 by means of the minor passageways 43 and 44. As a strand is being extruded through the openings 32 and 37, the cooling fluid is forced through the annular space 46 and is discharged generally annularly around the extruded plastic strand, to provide a cooled external surface of the strand, that is, sufficiently rigid to cut without smearing when impacted by a cutter blade such as the cutter blade of FIG. 1. The apparatus of the present invention is of sufficiently simple construction that when the cooling jacket 36 is made of two pieces as indicated by the parting lines A in FIG. 2, it is readily disassembled for cleaning. Any scale resulting from the extended use of cooling water can readily be removed by brushing mild acid or other treatment appropriate to the deposits made by the particular water employed. Minor leakage between the two portions of such a water jacket generally is not significant. The die including the water jacket is of generally simple construction and can readily be prepared with lathe and milling machines as the principle tools.

Figure 5:
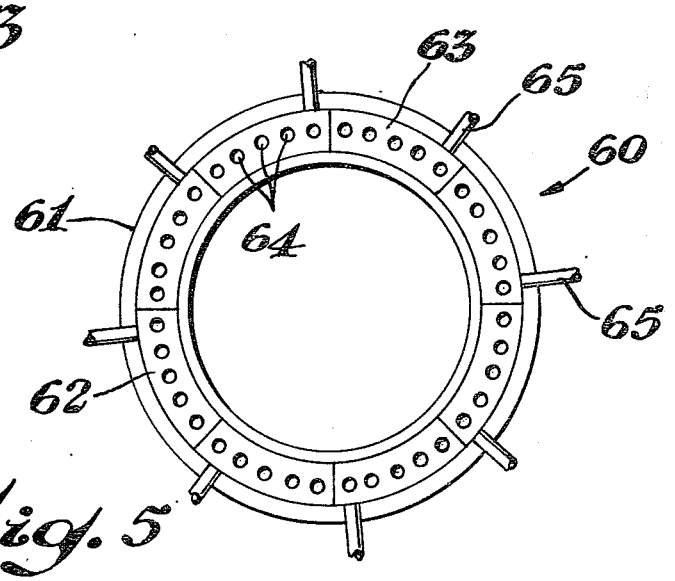
FIG. 5 is a face view of an alternate die in accordance with the present invention.

In FIG. 5 there is schematically depicted a die assembly in accordance with the present invention generally designated by the reference numeral 60. The die 60 comprises an annular die body 61 defining a plurality of extrusion orifices and being generally similar in construction to the die body 26. On the extrusion face of the die body 61 is disposed a segmented jacket 62. The jacket 62 comprises a plurality of jacket segments 63 defining a plurality of extrusion orifices 64. Each of the segments 63 has a cooling fluid inlet 65. Functionally, the die 60 is identical to the die 13 of FIG. 1, but is provided with a segmented jacket 62, the segments 63 of which are individually fixed to the die face in the manner of the jacket 36 of FIG. 2. In the event that the die has a relatively large diameter, for example, 30 inches, the jacket and die body operate at widely differing temperatures. The expansion of the die body 61 will cause substantial misalignment of the extrusion orifices in the die body 61 and the openings in a matching annular cooling jacket. In the embodiment of FIG. 5, the segments are free to move as the die body 61 expands. As the temperature is raised and the minor misalignment caused, the temperature differential can be disregarded.

Due to the direct fluid cooling of the face against which the knife works, smearing and sticking of the polymer to the blade or face is eliminated. Apparatus in accordance with the present invention can be employed to pelletize any extrudable heat-plastifiable synthetic resinous material capable of being pelletized with a die face cutter.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the here-to appended claims.

What is claimed is:

1. An apparatus for the preparation of granules from a plurality of extruded heat-plastified synthetic resinous thermoplastic strands, the apparatus comprising in cooperative combination an annular die, the die having a die body, the die body defining an annular plenum, the plenum having means to communicate with a source of heat-plastified synthetic resinous material, the die having a die face of generally circular configuration, the die body adjacent the die face defining a plurality of circularly arranged extrusion openings communicating with the annular plenum, the extrusion openings capable of extruding a heat-plastified synthetic resinous strand, the extrusion openings terminating on the die face remote from the means to communicate with such a source of heat-plastified thermoplastic resinous material, a generally annular cooling fluid jacket disposed adjacent the die face, the cooling fluid jacket comprising a plurality of segments individually affixed to the die body defining a plurality of jacket extrusion openings corresponding to the extrusion openings, the cooling fluid jacket being supported by the die body, the cooling fluid jacket defining a jacket cavity therein, the cavity having means to receive cooling fluid from space external to the cooling fluid jacket, each of the jacket extrusion openings in the cooling fluid jacket having in association therewith at least one passage in communication with the jacket cavity whereby on supply of cooling fluid and heat-plastified synthetic resinous material to the apparatus, synthetic resinous material and cooling fluid are discharged from the jacket extrusion openings, a rotatable cutter operatively associated with said jacket extrusion openings to engage extruded thermoplastic strands emerging from the openings on the cooling fluid jacket and sever the strands into pellets or granules.

2. The apparatus of claim 1 wherein each of the jacket extrusion openings define an inwardly facing annular space, the annular space being in communication with the passage in communication with the jacket cavity.

3. An apparatus for the preparation of granules from a plurality of extruded heat-plastified synthetic resinous thermoplastic strands, the apparatus comprising in cooperative combination a die, the die having a generally annular die body, the die body defining a plenum, the plenum having means to communicate with a source of heat-plastified synthetic resinous material, the die having a die face of generally circular configuration, the die body adjacent the die face defining a plurality of circularly arranged extrusion openings communicating with the annular plenum, the extrusion openings capable of extruding a heat-plastified synthetic resinous strand, the extrusion openings terminating on the die face remote from the means to communicate with the source of heat-plastified thermoplastic resinous material, a generally annular cooling fluid jacket disposed adjacent the die face and being generally spaced from the die face, the cooling fluid jacket defining a plurality of jacket extrusion openings corresponding to the extrusion openings, the cooling fluid jacket being supported by the die body, the cooling fluid jacket comprising a plurality of segments individually affixed to the die face, the cooling fluid jacket segments defining a jacket cavity therein, the cavity having means to receive cooling fluid from space external to the cooling fluid jacket segments, the jacket extrusion openings having an inwardly facing annular space, the annular space being in communication with the passage in communication with the jacket cavity, the annular space in the cooling fluid jacket having in association therewith at least one passage in communication with the jacket cavity whereby on supply of cooling fluid and heat-plastified synthetic resinous material to the apparatus, synthetic resinous material and cooling fluid are discharged from the jacket extrusion openings, a rotatable cutter downstream of said die to engage extruded thermoplastic strands emerging from the openings of the cooling jacket and sever the strands into pellets or granules.

* * * * *